. United States Patent [19]

Pacaud et al.

[11] Patent Number: 4,976,944

[45] Date of Patent: Dec. 11, 1990

[54] PURIFICATION OF SILANE GAS

[75] Inventors: Bernard Pacaud, Nanterre; Jean-Michel Popa, Drancy; Claude-Bernard Cartier, Villeneuve/Saint/Georges, all of France

[73] Assignee: Rhone-Poulenc Chimie, Courbevoie, France

[21] Appl. No.: 261,408

[22] Filed: Oct. 24, 1988

[30] Foreign Application Priority Data

Oct. 28, 1987 [FR] France .................................. 87 14906

[51] Int. Cl.$^5$ ........................ C01B 33/04; B01D 53/02
[52] U.S. Cl. ........................................ 423/347; 55/74; 55/75
[58] Field of Search ....................... 423/347; 55/74, 75

[56] References Cited

FOREIGN PATENT DOCUMENTS

| 595816 | 4/1960 | Canada | 423/347 |
|---|---|---|---|
| 622438 | 6/1961 | Canada | 423/347 |
| 632238 | 12/1961 | Canada | 423/347 |
| 0030711 | 2/1984 | Japan | 423/347 |
| 1053106 | 3/1986 | Japan | 423/347 |
| 1168518 | 7/1986 | Japan | 423/347 |

Primary Examiner—Gary P. Straub
Assistant Examiner—Lori F. Cuomo
Attorney, Agent, or Firm—Burns, Doane, Swecker & Mathis

[57] ABSTRACT

Impure gaseous silane containing such impurities as, in particular, phosphines and arsines, is purified, whether by chemisorption and/or physical adsorption, by contacting such silane gas with a sorption mass that includes cooper values, e.g., a copper cation-exchanged molecular sieve.

22 Claims, No Drawings

PURIFICATION OF SILANE GAS

BACKGROUND OF THE INVENTION

1. Field of the Invention

The present invention relates to the purification of silane, and, more especially, to the purification of silane gas by the sorption of impurities therefrom, such as, for example, the arsine and phosphine values.

2. Description of the Prior Art

Silane is a gas which, by thermal cracking for example, yields silicon, an especially valuable compound used for the production of a variety of electronic components. The silicon used for the production of such electronic components must be of a very high purity To attain such a purity, it is necessary to prepare the silicon from a very pure silane and in particular to reduce to a minimum the impurities of arsine or phosphine type. It is thus imperative to purify the silane prior to the cracking stage in order to reduce the impurity content and, in particular, to reduce the impurity content thereof to less than 10 ppb (parts per billion).

This purification is typically carried out by methods such as distillation or adsorption onto molecular sieves.

It has thus been proposed to this art to adsorb the phosphine and/or arsines onto molecular sieves comprising zeolites of the A or X type. However, these molecular sieves have the disadvantage of adsorbing a portion of the silane, which militates against high yields of purification. Furthermore, if a high purity silane is to be realized, it is necessary to subject it to several successive passes through the molecular sieve, with concomitant loss of silane by adsorption during each pass.

To eliminate these disadvantages, it was proposed in the Japanese application published under No. 84/30,711 to use an A type zeolite exchanged with the $Ag^+$ cation, thus permitting the selective adsorption of arsine and phosphine values relative to the silane.

SUMMARY OF THE INVENTION

It has now unexpectedly been discovered that impurities such as arsine and phosphine values can be selectively adsorbed from a silane feedstream utilizing a sorption mass containing copper, without concomitant loss of silane final product, in high yields of purification. The copper-containing sorption mass according to this invention also permits the elimination of other impurities, such as diborane.

DETAILED DESCRIPTION OF THE PREFERRED EMBODIMENTS OF THE INVENTION

More particularly according to the present invention, by "sorption" is intended the phenomena of both physical adsorption and chemisorption by reaction of the impurities with the copper present in the sorption mass.

Therefore, as the impurities are adsorbed chemically by the copper, such chemisorption and thus the purification of the silane, is quasi-independent of the partial pressure of the various different impurities contained in the silane. In contrast, in the case of physical adsorption, the purification yield is directly proportional to the partial pressure of the impurities in the gas to be purified.

This makes it possible to obtain a high purification yield regardless of the concentration of the impurities and, particularly, even in the case of very low impurity concentrations. Furthermore, the chemisorption of the impurities enables the realization of a purified silane having very low impurity concentrations, especially in arsine and phosphine values, appreciably lower than those obtained by physical sorption.

The sorption mass of the invention exhibits a high static sorption capacity and a high dynamic capacity (very close to the static capacity), for short contact times.

By "static capacity" is intended the amount of impurities retained by the sorption mass, per gram of such sorption mass.

By "dynamic capacity" is intended the amount of impurities retained by the sorption mass, per gram of such sorption mass, for a given flow rate and velocity of the gases treated and for a given pass threshold. The pass threshold is the maximum permissible impurity concentration in the gas to be treated. Obviously, this concentration is selected as a function of the desired purity of the gas. The dynamic capacity is a characteristic of a discontinuous adsorption process entailing passing the gas to be treated through a stationary adsorbent bed contained in a column.

For this purpose, the invention features a process for the purification of silane by the elimination, by sorption, of impurities therefrom, comprising contacting the impure silane gas with a sorption mass containing copper.

As above indicated, the most important impurities to be eliminated comprise arsine and phosphine values.

In a first embodiment of this invention, the sorption mass comprises a support onto which the copper is deposited.

By "onto which the copper is deposited" is intended to connote that the copper, typically in the form of the oxides thereof, is present on the surface of the support, in particular on the surfaces of the pores, if the support is a porous material Such amounts of copper may be incorporated by deposition, by impregnation of the support, by co-mixing a copper compound with the material constituting the support, or by any other similar means.

The support is preferably a porous inorganic material.

Exemplary porous inorganic materials are alumina, silica, the silicoaluminates, titanium dioxide, zirconium oxide, cerium oxide, magnesium oxide, and the like Preferably, the porous inorganic material is alumina.

In a preferred embodiment of the invention, the support advantageously has a specific surface of from 30 to 600 $m^2/g$.

Advantageously, the amount of copper comprising the support ranges from 3 to 15% by weight, expressed as metallic copper, relative to the weight of the support.

In a second preferred embodiment of the invention, the sorption mass comprises a molecular sieve, preferably a zeolite, exchanged with a copper cation.

Representative such zeolites are the synthetic zeolites of the A, X or Y types, such as, for example, the zeolites 3A, 4A and 5A, or the 13X type zeolites.

Numerous such zeolites are known to this art and these are essentially of the aluminosilicate type. Compare, for example, U.S. Pat. Nos. 2,882,243, 2,882,244 and 3,130,007, respectively describing A, Y and X type zeolites.

These zeolites are generally synthesized in the form of the sodium salt thereof (type 4A). The sodium may be exchanged by different cations, for example the potassium cation (type 3A), or the calcium cation (type 5A).

In another embodiment of the invention, at least a fraction of the zeolite cations is exchanged with the copper cation, preferably the cupric cation The preferred degree of exchange ranges from 20 to 80%.

The exchange by the copper cation is carried out in the conventional manner, by immersing the zeolite in a solution of a copper salt, preferably the cupric salt, under agitation and either with or without heating The exchanged zeolite is then filtered, washed and dried.

The zeolite produced in this manner may be shaped by any known means, for example granulation, pelleting, extrusion, etc.

Thus, the zeolite may be extruded with a clay type binder, such as kaolin, bentonite, montmorillonite.

In general, the sorption mass may be shaped by any conventional forming process and may contain any additive facilitating the shaping operation, such as lubricants, plasticizers, or the like, or compounds reinforcing the mechanical properties, should this be necessary.

In yet another embodiment of the invention, the sorption mass may be regenerated by oxidation and advantageously by contacting same with air.

In order to further illustrate the present invention and the advantages thereof, the following specific examples are given, it being understood that same are intended only as illustrative and in nowise limitative.

EXAMPLE 1

Preparation of a Sorption Mass Based on Alumina

The support was an activated alumina trihydrate, designated alumina A and marketed by Rhone-Poulenc Co. in the form of pellets having approximate diameters of 2 to 5 mm and a specific surface of 350 m²/g.

An impregnating solution was prepared by dissolving hydrated copper nitrate in water. The solution obtained contained 20% by weight of metallic copper.

This solution was poured into a vessel containing the alumina pellets After impregnation, the pellets were dried and calcined at 450 . The resulting product had an ignition loss at 1,000° C. of 8% and a metallic copper content equal to 8% by weight.

The specific surface of such product was 186 m²/g.

The mass recovered in this manner was ground, then provided with, by screening, a grain size distribution of from 0.16 to 0.25 mm, then conditioned by helium flushing for 3 hours at 300° C., and cooled to 25° C. in a nitrogen atmosphere.

EXAMPLE 2

Purification of Silane (Elimination of Phosphine Values)

80 mg of the sorption mass prepared and conditioned according to the procedure of Example 1 were placed into a column. A gas containing 0.001% phosphine, 1% helium and 99% $SiH_4$ was charged into the column at a rate of 40 l/h. The temperature of the sorption was 25° C.

The gases were analyzed after exiting the column, by gaseous phase chromatography.

The static capacity of the sorption mass relative to the phosphine was equal to 0.32%.

The dynamic capacity was 0.24% with a pass threshold of 15 ppb.

EXAMPLE 3

The sorption mass used in Example 2 was regenerated by helium flushing for 30 min at 300° C., then flushed with air for 2 h, 30 min, at a temperature of 250° to 300° C.

The regenerated mass was used to treat a silane gas containing 0.001% $PH_3$ at a flow rate of 40 l/h.

The static capacity of the sorption mass was 0.24% and the dynamic capacity 0.15%.

EXAMPLE 4

The sorption mass prepared according to Example 1 was used to treat a silane gas containing 0.001% arsine. The flow rate of the gas treated was 20 l/h. The temperature of the sorption was 25° C. and the sorption mass weighed 200 mg Arsine was detected in the outlet gas by gaseous phase chromatography.

The static capacity of the sorption mass relative to arsine was 0.69%, and the dynamic capacity was 0.32%, with a pass threshold of 15 ppb.

EXAMPLE 5

The sorption mass employed in Example 4 was regenerated by the process described in Example 3.

The static adsorption capacity of the regenerated mass relative to a gas containing 0.001% arsine, at a flow rate of treatment of 20 l/h, was measured.

The static capacity was equal to 0 40% and the dynamic capacity to 0.16%.

EXAMPLE 6

Preparation of a Molecular Sieve Exchanged with Cupric Cations:

The solution of cupric salts for exchanging the molecular sieve was prepared by dissolving copper acetate in water, at ambient temperature, the concentration of the solution being equal to 0.2 M in copper acetate.

The exchange was carried out by adding a zeolite of type 13X to the above solution, having a $SiO_2/Al_2O_3$ ratio equal to 2.23 and an ignition weight loss at 1,000° C. of 16.1%. The added mass constituted 100 g of the dehydrated 13X sieve. The exchange was carried out for 5 h under agitation.

The sieve was recovered by filtration and dried at 100° C., after washing with water.

The resulting sieve had the following composition, in parts by weight:

| | |
|---|---|
| $Al_2O_3$ | 1 |
| $SiO_2$ | 2.23 |
| $Na_2O$ | 0.567 |
| CuO | 0.48 |

The degree of exchange of the 13X sieve with $Cu^{2+}$ copper was 62.9%.

This sieve, in the form of a powder, was agglomerated by mixing it with clay, for example kaolin, in a proportion of 80% 13X sieve—20% clay (% by weight, expressed as dry weight dehydrated at 1,000° C.). The powder was mixed by kneading, then shaped by any known means and in particular by extrusion.

In the present case, extrusions 1.6 mm in diameter and 4 mm in length were formed. These extrusions were then ground and screened to isolate the fraction having a grain size distribution of from 0.16 to 0.25 mm.

EXAMPLE 7

The type 13X zeolite, exchanged with the copper cation according to the process of Example 6, having a grain size distribution of 0.16 to 0.25 was packed into a column in which a silane gas containing 0.001% phosphine was introduced at a rate of 40 l/h. The column was filled with 110 mg of the zeolite of Example 6. The static capacity in phosphine was equal to 0.35%.

The dynamic capacity was equal to 0.17%, with a pass threshold of 15 ppb.

COMPARATIVE EXAMPLE 8

The procedure of Example 7 was repeated but using a 13X type zeolite that had not been exchanged with copper.

The static capacity was equal to 0.008% and the dynamic capacity was 0.003% (pass threshold 15 ppb).

EXAMPLE 9

200 mg of type 13X zeolite prepared according to the process of Example 6 was used to purify a silane gas containing 0.001% arsine. The flow of gas was 20 l/h and the temperature of the zeolite was 25° C.

The static capacity in arsine of the zeolite was 0.61% and its dynamic capacity 0.40% (pass threshold 15 ppb).

COMPARATIVE EXAMPLE 10

The procedure of Example 9 was repeated, except that the 13X type zeolite was not exchanged with copper.

The static capacity of the zeolite relative to arsine was equal to 0.024% and the dynamic capacity to 0.010%.

EXAMPLE 11

Using a process similar to that described in Example 6, a zeolite of type 4A was exchanged with cupric ions. A degree of exchange of 65% was attained 20o mg of the sorption mass produced in this manner were placed in a column to treat a flow of 20 l/h of silane containing 0.001% arsine.

The static capacity was equal to 0.45% and the dynamic capacity to 0.25% for a pass threshold of 15 ppb.

EXAMPLE 12

Using a process similar to that of Example 6, a zeolite of the NaY type was exchanged with cupric ions A degree of exchange of 65% was attained The sorption mass produced in this manner was used to treat a flow of 20 l/h of silane containing 0.001% arsine. The column contained 200 mg of the sorption mass.

The static capacity was 0.28% and the dynamic capacity 0 15% (pass threshold, 15 ppb).

EXAMPLE 13

The zeolite of type 13X used in Example 9 was regenerated by flushing with helium for 30 min at 300° C., then flushed with air for 2 h, 30 min, at a temperature of 250° to 300° C.

The sorption mass regenerated in this manner was used to treat a silane containing 0.00% $AsH_3$, at a rate of 20 l/h.

The static capacity of the zeolite mass was equal to 0.45% and its dynamic capacity was 0.25% (pass threshold, 15 ppb).

While the invention has been described in terms of various preferred embodiments, the skilled artisan will appreciate that various modifications, substitutions, omissions, and changes may be made without departing from the spirit thereof Accordingly, it is intended that the scope of the present invention be limited solely by the scope of the following claims, including equivalents thereof.

What is claimed is:

1. A process for purification of impure gaseous silane comprising contacting such silane with a solid sorption mass comprising copper values, said copper values existing primarily in an oxidation state of $2^+$.

2. The process as defined in claim 1, said sorption mass comprising a solid support having said copper values deposited thereon, wherein said solid support comprises a molecular sieve or an inorganic material, said inorganic material comprising alumina, silica, silicoaluminate, titanium oxide, zirconium oxide, cerium oxide, magnesium oxide or an admixture thereof.

3. The process as defined in claim 2, said solid support having a specific surface ranging from 30 to 600 m²/g.

4. The process as defined in claim 1, said sorption mass comprising from 3 to 15% by weight of copper, expressed as elemental copper values.

5. The process as defined by claim 1, said copper values being present in the form of copper oxide.

6. The process as defined by claim 2, said molecular sieve comprising a cupric cation exchanged molecular sieve.

7. The process as defined by claim 6, said molecular sieve comprising a type A, X or Y synthetic zeolite.

8. The process as defined by claim 6, said molecular sieve being from 20% to 80% cupric cation-exchanged.

9. The process as defined by claim 1, said impure gaseous silane comprising phosphine and/or arsine impurities.

10. The process as defined by claim 9, said impure gaseous silane comprising diborane impurities.

11. The process as defined by claim 1, said purification comprising both chemisorption and physical adsorption of impurities from such impure gaseous silane.

12. The process as defined by claim 1, comprising regenerating said sorption mass by oxidation.

13. The process as defined by claim 1, carried out continuously.

14. The process as defined by claim 1, carried out discontinuously.

15. The process as defined by claim 2, said sorption mass comprising from 3 to 15% by weight of copper, expressed as elemental copper values.

16. The process as defined by claim 2, said copper values being present in the form of copper oxide.

17. The process as defined by claim 2, said impure gaseous silane comprising phosphine and/or arsine impurities.

18. The process as defined by claim 17, said impure gaseous silane comprising diborane impurities.

19. The process as defined by claim 2, said purification comprising both chemisorption and physical adsorption of impurities from such impure gaseous silane.

20. The process as defined by claim 2, comprising regenerating said sorption mass by oxidation.

21. The process as defined by claim 2, carried out continuously.

22. The process as defined by claim 2, carried out discontinuously.

* * * * *